Figure 1:
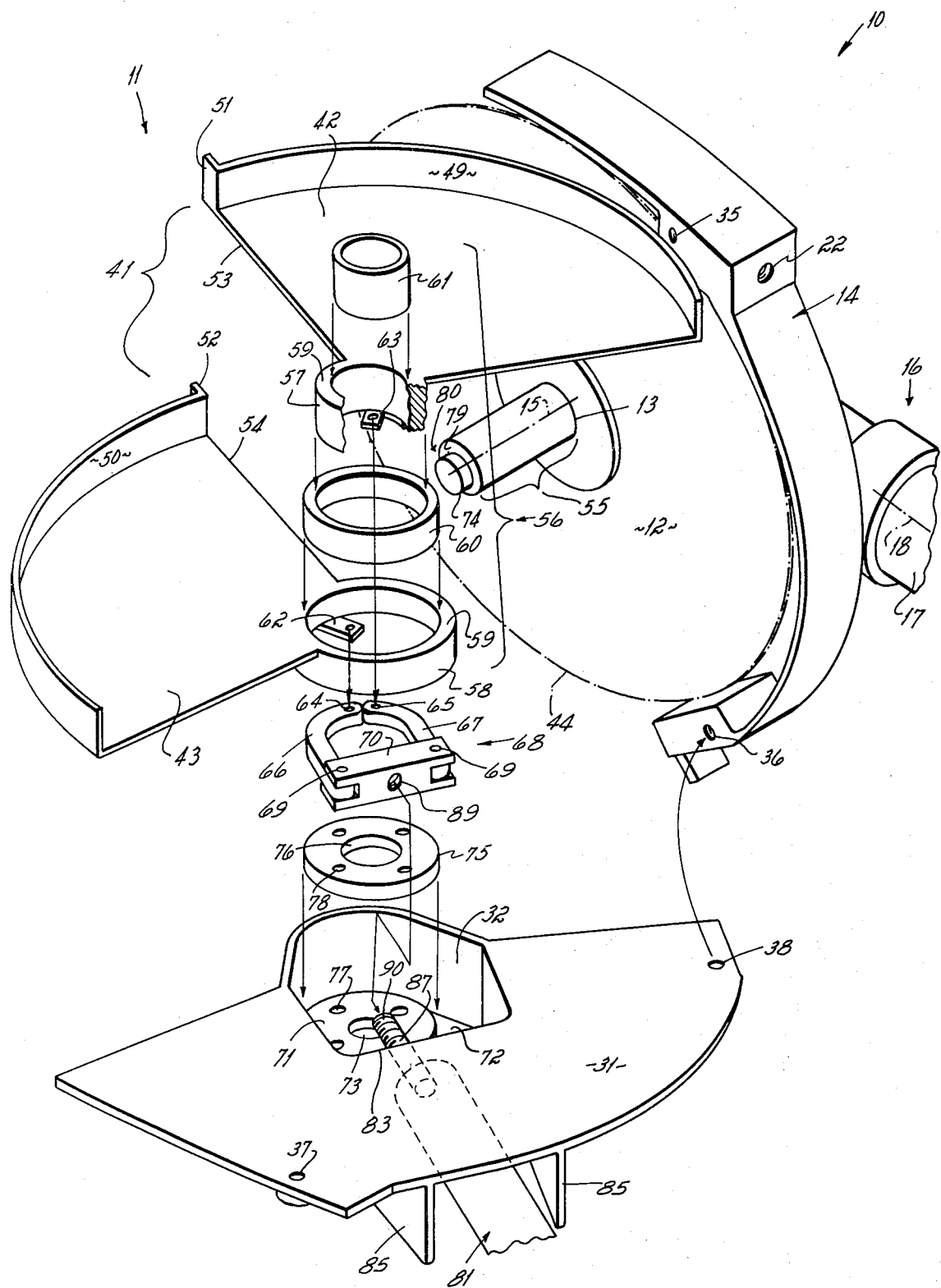

United States Patent [19]
Peter

[11] 3,805,639
[45] Apr. 23, 1974

[54] SAFETY GUARD FOR A BREAKING SAW
[75] Inventor: Joseph E. Peter, Cincinnati, Ohio
[73] Assignee: Best & Donovan, Cincinnati, Ohio
[22] Filed: Nov. 21, 1972
[21] Appl. No.: 308,532

[52] U.S. Cl.......................... 74/616, 30/391, 83/860
[51] Int. Cl............................................. F16p 3/00
[58] Field of Search ................ 74/616; 30/391, 390; 83/860

[56] References Cited
UNITED STATES PATENTS
2,722,246   11/1955   Arnoldy................................ 30/391
3,613,748   9/1969   De Pue................................. 30/391

Primary Examiner—Samuel Scott
Assistant Examiner—F. D. Shoemaker
Attorney, Agent, or Firm—Wood, Herron & Evans

[57] ABSTRACT

A safety guard for a breaking saw that automatically closes to protect the entire periphery of the saw's circular blade as soon as the saw's power is cut off, and that automatically opens to expose the saw's circular blade for cutting as soon as the saw's power is turned on.

The safety guard structure includes a fixed cover mounted to the saw for protecting one segment of the circular blade, and a movable cover characterized by a pair of clamshells for protecting the other segment. The clamshells are adapted to pivot about the circular blade's rotational axis between a closed position and an open position, the clamshells overlying the circular blade's periphery for protecting against inadvertent contact when in the closed position and exposing the circular blade's periphery for cutting when in the open position. An open/close motor is mounted to the fixed cover for automatically opening and closing the clamshells, the open/close motor also being interconnected with the saw's drive motor (thereby interconnecting the open/close motor with the drive motor's off/on switch). The open/close motor is energized when the drive motor's off/on switch is activated by an operator to commence rotation of the circular blade, thereby automatically retracting the clamshells from the closed to the opened position. The open/close motor is spring loaded to drive the clamshells from the opened to the closed position when the drive motor's off/on switch is released by the operator, thereby automatically returning the clamshells from the opened to the closed position.

8 Claims, 3 Drawing Figures

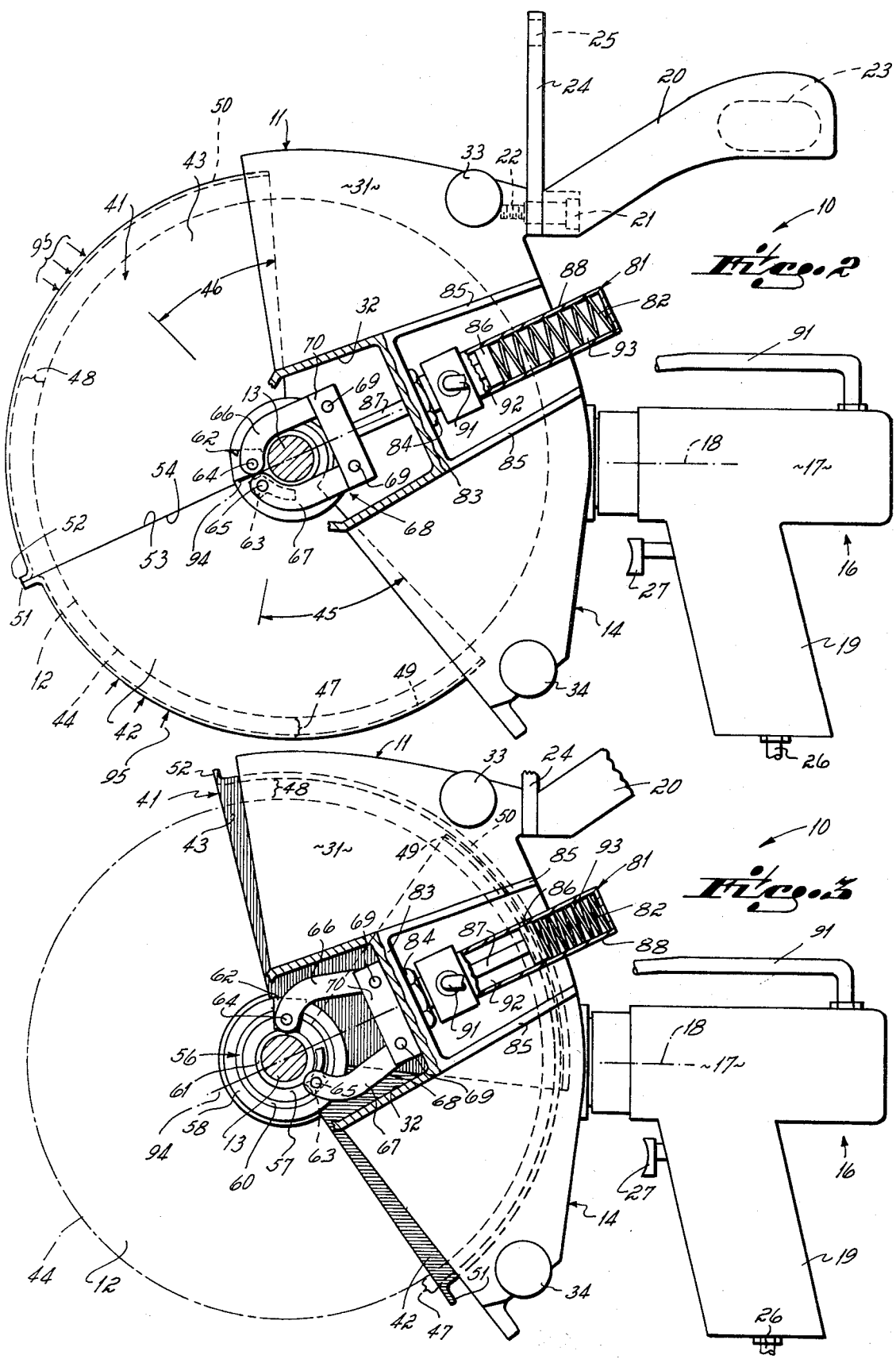

SAFETY GUARD FOR A BREAKING SAW

This invention relates to meat cutting machines and, more particularly, this invention relates to a meat cutting machine of the breaking saw type.

The use of meat cutting machines in the meat processing industry has become quite commonplace over the yesrs in an effort to upgeade the economic efficiency of that industry. One basic class of meat cutting machine is that which makes use of a circular saw blade, the circular saw blade being rotated at a relatively high rpm to cut bone and/or meat in processing of the meat from carcass form to commercial meat cuts. One particular type of meat cutting machine which makes use of a circular saw blade is known as a breaking saw in the meat processing industry. A breaking saw is mainly characterized by the structural combination of a circular saw blade, drive means for rotating the blade, and a handle(s) for holding the saw during use. This structural combination is of relatively light weight such that, when in use, it can be manipulated into substantially any spatial orientation desired by an operator while being held in one or both hands.

A breaking saw is mainly used for the 'breaking' of beef and/or pork carcasses. By breaking is meant the cutting or sawing through of rib bones and/or meat sections in a carcass, thereby forming primal cuts (or forming smaller sections that can be more easily processed into primal cuts) which can be marketed to retail sales outlets for customer distribution. In the case of a beef carcass operation, the operator may take a full side of beef and break or saw it into fore and hind quarters. The operator then breaks those fore and hind quarters into multi-kinds of primal cuts. The many uses of a breaking saw, in connection with beef carcasses, include separating breastplate from chuck, removing standing ribs from a full quarter, sawing rib bones, sawing chuck, and the like. In the case of a pork carcass operation, use of the saw is generally similar to that in a beef processing operation. That is, the pork carcass is sawed or broken into desired cuts by means of the breaking saw. Typically, the uses of a breaking saw in connection with a pork processing operation include sawing of pork shoulders, ham marking, leg cut off, and the like.

Use of a high speed circular saw, such as a breaking saw, to perform beef and/or pork carcass processing operations allows the number of carcasses processed per man hour to be greatly increased over manual sawing methods. Further, a high speed circular saw blade eliminates ragged edges and/or splinters in the rib bones that might arise in manual sawing methods. The breaking of a beef or pork carcass may be accomplished while the carcass is passing an operator's station on a moving conveyor, or may be accomplished while it is lying stationery on a table in front of an operator. The breaking of a carcass may also be accomplished while the carcass is hanging from a hook or an overhead rail. However, to perform a breaking operation on either a beef or pork carcass it is apparent that the periphery or cutting edge of the circular saw blade must at all times be exposed during the cutting operation. This for the reason, of course, that the circular saw blade's periphery must be exposed at least in part to the bones and meat on the carcass to permit the sawing operation to proceed. While it is known in the prior art to protect a segment of the circular saw blade by means of a guard-like enclosure, as far as I am aware there is no safety guard structure known for that segment of the circular saw blade which must be exposed in order to allow the cutting operation to proceed.

A breaking saw of the prior art is usually stored in one of two different ways when not actually being grasped or held by an operator. First, the breaking saw may be provided with means which allows it to be hung on a wall hook during periods of non-use. Second, the breaking saw may be hung from an overhead counterbalance mechanism, the breaking saw simply being pushed upwardly during periods of non-use.

In light of the non-guarded or exposed segment of the circular saw blade that is presented in cutting contact with the meat carcass as the breaking saw is used in the breaking operation, a breaking saw of the circular saw blade type presently known to the art may well provide potential safety hazards to the operator, and especially to a new or unskilled operator. This may be especially the case as the saw is engaged with or disengaged from a cutting attitude with the meat carcass, i.e., just prior to or immediately after the cutting step. This, of course, because a large segment of the saw blade's periphery is exposed not only during cutting of the meat carcass, but also when the saw is not in cutting use. Such potential safety hazards are present even when the saw is being used by the most skilled operator with a great deal of care in the correct operational manner.

A typical example of such a potential safety hazard that may arise occurs where the breaking saw is hung from an overhead counterbalance mechanism. If an operator is making use of a breaking saw so hung, and if, for example, he is working on a carcass positioned on a table in front of him or hung from an overhead rail, it may very well prove desirable to the operator to reorient or reposition the carcass so as to make the cutting operation a little easier for himself. To accomplish this, the operator may temporarily release the breaking saw while he rearranges or reorients the meat carcass on the table, or on the hook from which it is hung; the breaking saw is retained at its set height during this period by the counter-balance mechanism from which it is hung. When the operator releases the breaking saw, and if same is not in a relatively plumb or vertical position, the saw will tend to swing back and forth in a pendulum-like arc. Even though most breaking saws have an automatic cut-off switch which turns off power to the saw when the operator's off/on switch is released, it still requires a few seconds for the circular saw blade to coast to a complete stop. While the saw blade is coasting to a stop, and if the breaking saw is allowed to swing in a pendulum-like arc, the cutting segment of the circular saw blade's periphery may very well come into contact with an operator at an adjacent work station, or may, indeed, swing back into the operator making use of the breaking saw. Of course, because of the relatively high rpm at which the circular blade operates, contact of an operator's arm or hand with the cutting edge of the breaking saw would be dangerous and, obviously, may provide a severe cut or worse.

Therefore, it has been an objective of this invention to provide a safety guard for a hand-held power saw of the circular saw blade type (e.g., a breaking saw commonly used in the meat processing industry), that safety guard opening automatically when the saw's off-/on switch is activated by an operator and closing automatically when the saw's off/on switch is deactivated by an operator.

It has been a further objective of this invention to provide a safety guard for a hand-held power saw of the circular saw blade type (e.g., a breaking saw commonly used in the meat processing industry) wherein the automatic opening and closing of the safety guard is substantially instantaneous relative to activating or deactivating of the saw's off/on switch by an operator.

It has been another objective of this invention to provide a safety guard for a hand-held power saw of the circular blade type (e.g., a breaking saw commonly used in the meat processing industry), that safety guard providing a pair of clamshell type covers adapted to pivot between opened and closed positions about the circular blade's rotational axis.

It has been still a further objective of this invention to provide a safety guard especially structured for a breaking saw of the type commonly used in the meat processing industry, that guard automatically closing to protect fully the circular blade's periphery during non-use, and automatically opening to expose the circular blade's periphery during cutting use.

It has been still another objective of this invention to provide a safety guard especially structured for a breaking saw of the type normally used in the meat processing industry, all of the components of that safety guard being comprised in a single unit that is easily removable from the saw's housing so as to permit quick changing of the circular blade when desired by an operator.

In accomplishing the objectives of this invention there is provided a safety guard for a breaking saw that automatically closes to protect the entire periphery of the saw's circular blade as soon as the saw's power is cut off, and that automatically opens to expose the saw's circular blade for cutting as soon as the saw's power is turned on.

The safety guard structure of this invention includes a fixed cover mounted to the saw for protecting one segment of the circular blade, and a movable cover characterized by a pair of clamshells for protecting the other segment. The clamshells are adapted to pivot about the circular blade's rotational axis between a closed position and an open position, the clamshells overlying the circular blade's periphery for protecting against inadvertent contact when in the closed position and exposing the circular blade's periphery for cutting when in the open position. An open/close motor is mounted to the fixed cover for automatically opening and closing the clamshells, the open/close motor also being interconnected with the saw's drive motor (thereby interconnecting the open/close motor with the drive motor's off/on switch). The open/close motor is energized when the drive motor's off/on switch is activated by an operator to commence rotation of the circular blade, thereby automatically retracting the clamshells from the closed to the opened position. The open/close motor is spring loaded to drive the clamshells from the opened to the closed position when the drive motor's off/on switch is released by the operator, thereby automatically returning the clamshells from the opened to the closed position.

Further objectives and advantages of this invention will be more apparent from the following detailed description taken in conjunction with the drawings in which:

FIG. 1 is an exploded perspective view illustrating a non-assembled safety guard in accord with the principles of this invention in combination with a breaking saw of the type commonly used in the meat processing industry;

FIG. 2 is a side elevational view of the assembled safety guard structure in combination with the breaking saw illustrating the safety guard in the closed position with the saw's circular blade being completely protected against inadvertent contact by an operator; and FIG. 3 is a view similar to FIG. 2, but showing the safety guard in the opened position with the saw's circular blade being partially exposed for cutting use.

GENERAL STRUCTURE AND OPERATION OF A BREAKING SAW

A breaking saw 10 (i.e., a hand-held power saw) commonly used in the meat processing industry is illustrated in the Figures. The safety guard 11 of this invention is particularly adapted for use with the breaking saw 10.

As shown in FIGS. 1–3, the breaking saw 10 includes a circular blade 12 fixed in place on a drive shaft 13 that extends outwardly from the saw's housing 14, the drive shaft being adapted to rotate on axis 15. A primary handle 16 for grasping the breaking saw 10 is fixed to the housing 15. The primary handle 16 is of a pistol-grip type configuration with the barrel 17 portion being substantially radially oriented relative to the circular blade 12 and having an axis 18 substantially perpendicular to the rotational axis 15 of the circular blade, and with the grip portion 19 extending downwardly from the barrel portion to permit easy gripping by an operator's hand. A secondary handle 20 of stirrup-type configuration is fixed to the saw's housing 14 above the primary handle 16 by means of bolt 21 received in tapped hole 22 in the housing. The secondary handle 20 provides a crossbar 23 oriented substantially transverse to the plane defined by the pistol-grip configured primary handle 16, thereby allowing the saw 10 to be easily gripped and used by an operator. Strap 24 is also fixed to the saw's housing by bolt 21, the strap defining a hole 25 adjacent its upper end. The saw 10 may be easily hung from a counterbalance mechanism (not shown) or the like simply by hooking same onto the strap 24 through hole 25.

The circular blade's drive shaft 13 is connected to drive means (not shown) within the saw's housing 14. Motor means in the form of a pneumatic motor (not shown) is located within the primary handle's barrel 17, the pneumatic motor providing the motive power for the drive means (not shown). The pneumatic motor (such are commonly used in power breaking saws) is connected with a suitable air pressure source by air line 26. An off/on switch 27 for the drive motor is connected in trigger fashion to the primary handle's pistol grip 19. The off/on switch 27 is adapted to cooperate with a valve (not shown) which controls the air supply to the pneumatic motor (not shown) inside the handle's barrel 17. Thus, the trigger-like off/on switch 27 controls rotation of the circular blade. The drive motor, i.e., the motor means inside the handle's barrel 17, may be hydraulic or electric instead of pneumatic as described.

The weight and size of the breaking saw 10 is such that it can be easily handled and used by an operator with one of the operator's hands holding the pistol grip 19, and the other of the operator's hands holding the crossbar 23. In use, it will be apparent that an operator can hold the breaking saw's piston grip 19 with one hand and, with the index finger of that hand, operate the trigger-like off/on switch 27 simply by alternately squeezing and releasing the switch. The 'off' attitude of the trigger switch is illustrated in FIG. 2, and the 'on' attitude of the trigger switch is illustrated in FIG. 3. Of course, in the 'off' attitude the circular blade 12 is stationary and in the 'on' attitude the circular blade is rotating at a relatively high rpm. When the circular blade 12 is rotating, the breaking saw may be used by the operator to perform the cutting operation desired on a beef or pork carcass.

SAFETY GUARD STRUCTURE

The basic structural components of the safety guard structure of this invention are particularly illustrated in FIG. 1. Operational assembly of the safety guard components is illustrated in FIGS. 2 and 3.

The safety guard's basic structural components include a fixed cover 31 adapted to enclose and protect (in combination with the housing 14) a minor segment (i.e., less than about 180° but greater than about 90°) of the circular blade 12. The fixed cover 31 is basically plate-like in configuration, but is provided with a hollow enclosure 32 on the outer surface thereof which is adapted to receive certain structural components of the safety guard as describe below. The fixed cover 31 is particularly configured to cooperate with the saw's housing 14 so as to enclose the rearward segment of the circular blade 12, i.e., to enclose that segment of the blade disposed between about 12 o'clock and 5 o'clock positions when the saw is oriented as shown in FIGS. 2 and 3, adjacent the primary handle 16 and secondary handle 20 connections with the saw's housing 14; in that orientation of the saw 10, note that the primary handle extends from the housing at about the 3 o'clock position and the secondary handle extends from the housing at about the 2 o'clock position.

The fixed cover 31 is directly connected to the saw's housing 15 at two points by use of thumb screws 33, 34, received in tapped holes 35, 36, respectively. In other words, the fixed cover 31 is held in fixed relation with the housing (when the safety guard 11 is in the operational attitude as shown in FIGS. 2 and 3) only by means of the two thumb screws 33, 34 extending through the fixed cover's holes 37, 38 into the housing's tapped holes 35, 36. Thus, removal of the fixed cover 31 from bolted relation with the saw's housing 14 (by means of removing thumb screws 33, 34) allows the circular blade 12 to be easily changed. This for the reason that all other structural components of the safety guard 11 are directly connected to the guard's fixed cover 31. In other words, when the fixed cover 31 is removed from the 'in use' operational attitude illustrated in FIGS. 2 and 3 to the blade change attitude (not shown) in an assembly view but shown in an exploded or non-assembly perspective view in FIG. 1), all other safety guard components are removed therewith; this, of course, makes changing of the circular blade by the operator relatively easy since all components of the safety guard have been removed out of the way to totally expose the circular blade 12 free of the safety guard structure.

The safety guard's basic structural components also include a movable cover 41 (made up of two separate clamshell sections 42, 43) adapted tto protect a major segment, i.e., less than about 270° but greater than about 180°, of the circular blade 12. The clamshells 42, 43 that comprise the movable cover 41 are adapted to privot about the rotational axis 15 of the circular blade 12 between a closed position (FIG. 2) and an open position (FIG. 3), the clamshells overlying the circular blade's periphery 44 for protecting against inadvertent contact when in the closed position and exposing the circular blade's periphery for cutting when in the open position. Each of the clamshells 42, 43 is configured so that same can retract into the hollowed-out interior defined by the fixed cover 31 in cooperation with the saw's housing 14, i.e., into that area between the fixed cover and the circular blade 12. When assembled, note that the faces of each clamshell 42, 43 are in different planes, even though those planes are parallel one to the other. This allows the rearward arcuate areas 45, 46 of the clamshells 42, 43, respectively, to retract or telescope over one another when the clamshells are in the opened attitude as illustrated in FIG. 3.

The clamshells 42, 43 are particularly configured to protect a major segment of the circular blade 12 when the clamshells are in the closed position, see FIGS. 1 and 2. That is, the clamshells 42, 43 are sized and configured so that each provides a peripheral flange or section 47, 48 respectively, that overlies and extends beyond the circular blade's periphery 44 when the clamshells are closed. Further, the outer periphery of each clamshell 42, 43 is provided with a lip 49, 50, respectively, adapted to overlie the circular blade's periphery 44 in protective relation, each lip presenting a node 51, 52, respectively, at the leading edge 53, 54, respectively, of each clamshell. The noses 51, 52 of the two clamshells 42, 43 are configured to abut or overlie one another when the clamshells are in the fully closed attitude shown in FIG. 2 (it being recalled that the clamshells are in different but parallel planes) so that the clamshells have a very definite stop placed on their closing movement as they move from a fully opened attitude (FIG. 3) to a fully closed attitude (FIG. 2).

It is, of course, the major segment of the circular blade 12 that is presented to the meat carcass during cutting use of the breaking saw 10 as can be seen in FIG. 3. The extent to which the clamshells 42, 43 overlap or overlie the circular blade's periphery 44, i.e., the width of each section's peripheral segment 47, 48, in combination with the lip 49, 50 on each clamshell that also overlies the circular blade's periphery, is such that an operator's hand inadvertently contacting the leading edge 53, 54, respectively, of the clamshells would not contact the periphery 44 of the circular blade when the clamshells are closed. Thus, the movable cover 41 is adapted to protect a major segment of the circular blade's periphery 44, and the fixed cover 31 (in combination with the saw's housing 14) is adapted to enclose and protect a minor portion of the circular blade's periphery, when the safety guard 11 is closed as shown in FIG. 2.

As noted, the clamshells 42, 43 are adapted to pivot about the circular blade's rotational axis 15. To provide for such a pivotal function, the clamshells 42, 43 are carried on extension 55 of the blade's drive shaft 13 by a bearing sleeve assembly 56. As is particularly illustrated in FIG. 1, each of the clamshell sections 42, 43 mounts a hub 57, 58, respectively, at its inner end. Note that hub 57 is of a lesser diameter than hub 58, thereby allowing the hubs to be located in concentric relation within the bearing assembly 56. Note also that the axial length of hub 57 is greater than the axial length of hub 58, that the clamshells 42, 43 are quite thin relative to those axial lengths, and that the clamshells are mounted flush with the inner edge 59 of each hub. It is the difference in this axial length of hubs 57, 58 that allows one clamshell 42 to pivot in a different plane from the other clamshell 43 within the bearing assembly 56, thereby allowing same to retract or telescope over one another when in the opened attitude shown in FIG. 3.

In assembly, the clamshells' hubs 57, 58 are located in concentric relation one within the other, the huns being separated by a spacer bearing sleeve 60 that isolates clamshell hub 57 from clamshell hub 58 to allow independent rotation of the clamshells one of the other. Further, shaft bearing sleeve 61 is adapted to fit concentrically within the hub 58 of clamshell 42 to allow independent rotation of the clamshells 42, 43 relative to the drive shaft 13. Thus, the bearing sleeve 60, 61/clamshell hub 57, 58 assembly (i.e., the bearing assembly 56) is positioned over the extension 55 of the circular blade's shaft 13 in operational assembly with the breaking saw 10. Because the shaft bearing sleeve 61 isolates the clamshells 42, 43 from the continuously rotating drive shaft 13 (which drives the circular blade 12) when the braking saw 10 is being used in a cutting operation, the drive shaft's rotation does not affect the operational attitude (i.e., opened or closed attitude) of the clamshells at all.

NOte in FIG. 1 that each clamshell 42, 43 is provided with a lug 63, 62, respectively, that is fixed to its hub 57, 58 and directed radially inward relative to that hub. The lugs 63, 62 of the two clamshells 42, 43 are located in the same plane when the clamshells and bearing sleeves 60, 61 are in operational assembly. This allows each of the clamshells' lugs 63, 62 to be pinned as at 65, 64, respectively, to an arm 67, 66 of yoke 68. The arms 66, 67 of the yoke 68 are pivotally connected as at 69 to the yoke's cross member 70.

In assembly with the circular blade's drive shaft 13 and the bearing assembly 56, the yoke's arms 66, 67 are adapted to embrace the drive shaft, see FIGS. 2 and 3. The yoke 68 itself is interconnected with the open/close motor means that automatically pivots the clamshells 42, 43 between the opened attitude (as shown in FIG. 3) and the closed attitude (as shown in FIG. 2) as will be explained in detail below. Further, it is by means of the yoke 68 that the clamshells 42, 43 are connected to the fixed cover 31 as will be explained in detail below.

A first journal disc 71 is fixed to the inside ceiling 72 of enclosure 32 (the enclosing being mounted on the exterior face of the fixed cover 31). The first journal disc 71 defines a hole 73 centrally thereof, the diameter of that hole being substantially equal to the diameter of the reduced dowel section 74 at the outer end of the circular blade's drive shaft 13. A second journal disc 75 that defines a hole 76 is fixed to the first disc 71 by bolts (not shown) that extend through holes 77 in the enclosure's ceiling 72 and the first disc (i.e., that extend from the exterior of the fixed cover's enclosure 32) and cooperate with tapped holes 78 in the second disc. The diameter of the hole 76 defined by the second disc 75 is substantially equal to the inside diameter of the bearing sleeve 61, and the inside diameters of the bearing sleeve 61 and disc hole 76 are substantially equal to the diameter of the circular blade's drive shaft 13. Thus, and when the clamshells' bearing sleeve assembly 56 and yoke 68 are disposed over the circular blade's drive shaft 13 in operational relation therewith, the fixed cover 31 is located relative to the drive shaft by means of the drive shaft's dowel section 74 being received in the first disc's hole 73. This allows rim 79 at the drive shaft's outer end 80 to be seated against the first disc 71, thereby providing support for rotation of the drive shaft 13 at its outer end as it rotates the circular blade 12.

An open/close motor 81 is mounted to the fixed cover 31 for automatically opening and closing the clamshells 42, 43, the open/close motor also being interconnected with the saw's drive motor (thereby interconnecting the open/close motor with the drive motor's off/on switch 27). The open/close motor 81 is energized when the drive motor's off/on switch 27 is activated by an operator to commence rotation of the circular blade 12, thereby retracting the clamshells 42, 43 from the closed to the opened position. The open/close motor 81 is spring 82 loaded to drive the clamshells 42, 43 from the opened to the closed position when the drive motor's off/on switch 27 is released by the operator, thereby returning the clamshells from the opened to the closed position.

The open/close motor 81 is in the form of a pneumatic cylinder fixed to rear wall 83 of the fixed cover's enclosure 32 by nut 84. A pneumatic cylinder is used because the motor means for the circular blade is a pneumatic motor (not shown). The pneumatic cylinder 81 is protected on each side from inadvertent outside blows or bumps by webs 85 that extend lengthwise of the cylinder and that are mounted to the fixed cover 31. If the motor means for the circular blade 12 is a hydraulic motor than a hydraulic cylinder would be used in place of the pneumatic cylinder 81, and if the circular blade's motor means is an electric motor than an electric solenoid should be used in place of the pneumatic cylinder 81; this for the reason that the open/close motor 81 is interconnected with the saw's drive motor to achieve the automatic operation of the clamshells 42, 43 when the drive motor's off/on switch 27 is activated or deactivated.

The open/close motor 81 includes a piston head 86 and a piston rod 87 within cylinder 88, the piston rod 87 extending through enclosure's wall 83. Note that the piston rod 87 and cylinder 88 are radially oriented relative to the circular blade 12. This for the reason that it is desirable to have a radial force exerted by the piston rod 87 in both directions so as to operate automatically, in response to the pneumatic pressure in the cylinder 88 or the spring 82 loading, as is described below. In assembly, the piston rod 87 is connected with the yoke's cross member 70 by virtue of tapped hole 89 in the member 70 receiving threaded end 90 of the rod 87. An air line 91 from the pneumatic motor (not shown) in the saw's primary handle 17 is connected with high pressure chamber 92 in the cylinder 88, and the spring 82 is located within low pressure chamber 93 in the cylinder. Pneumatic pressure presented to high pressure side 92 of the cylinder 88, when high enough to overcome the counter pressure of spring 82, causes piston head 86 to move in the radially outward direction as illustrated in the Figures, and when that pneumatic pressure is released the compression spring 82 provides sufficient force to move the piston head 86 in the radially inward direction as illustrated in the Figures.

As noted, a pneumatic cylinder 81 is illustrated as the open/close motor for the safety guard 11 in the embodiment illustrated in this application for the reason that a pneumatic motor is the drive motor (not shown) employed in the primary handle 17 for rotating the circular blade 12. Of course, if the drive motor for the circular blade were a hydraulic motor, the open/close motor for the safety guard could likewise be operated with a hydraulic fluid in the same kind of cylinder 81 arrangement. On the other hand, it is often the case that breaking saws make use of an electric motor to power the circular blade 12. In that instance where an electric motor (as opposed to a pneumatic or hydraulic motor) is used for the circular blade's drive means, a spring loaded solenoid may be substituted for the spring loaded cylinder 81 as the open/close motor for the safety guard 11 structure. In such a substitution, and with an electric motor drive for the circular blade 12, activating the off/on switch trigger by an operator would energize the solenoid and, thereby, open the clamshells 42, 43, as well as turn on the electric motor for the blade. When the trigger-like off/on switch is deactivated by the operator, the solenoid would likewise be deactivated and the spring loading cause the solenoid armature to close the clamshells 42, 43.

In use, and as illustrated in FIGS. 2 and 3, the safety guard of this invention is adapted to move between a closed attitude in which the clamshells 42, 43 completely protect the circular blade 12, and an opened position in which the clamshells retract beneath the fixed cover 31 to expose the circular blade's cutting segment for cutting use. The opening and closing motion of the clamshell sections is automatic, i.e., is powered by the spring 82 loaded pneumatic cylinder 81 mounted on the exterior face of the fixed cover 31, and is substantially instantaneous upon activating or deactivating the trigger off/on switch 27 by an operator.

When it is desired to make use of the breaking saw, all the operator need do is activate the trigger-like off/on switch 27 (with the index finger of that hand which grasps the pistol grip 19) by moving it to the 'on' attitude illustrated in FIG. 3. This activation of the off/on switch 27 causes high speed rotation of the circular blade 12 to commence due to same being driven by the drive means (not shown) as powered by the pneumatic motor (not shown) within the barrel portion 17 of the primary handle 16. Simultaneous with energization of the pneumatic motor within the primary handle's barrel portion 17, the safety guard's open/close motor 81 is energized as air pressure is also introduced into high pressure chamber 92 through air line 91. When the pressure in high pressure chamber 92 overcomes the spring 82 loading in low pressure chamber 93, the cylinder head 86 is caused to move radially outward within the cylinder housing 88 as illustrated in the Figures. Such causes the yoke 68 to move radially outward, too. As the yoke 68 moves radially outward, and because the yoke's arms 66, 67 are pivotally connected to the clamshells' lugs 62, 63, the clamshells are caused to pivot in opposite directions relative one to the other about the circular blade's rotational axis 15 since same are separated by bearing sleeve 60. The clamshells 42, 43 pivot in opposite directions, and are retracted beneath the fixed cover 31, because the pivotal connections 64, 65 of the yoke's arms 66, 67 are on opposite sides of an imaginary line 94 that extends through the circular blade's rotational axis 15 and is coaxial with the power cylinder's connecting rod 87. The retraction or opening movement of the clamshells 42, 43 is limited by the yoke's cross member 70 abutting the wall 83 of the enclosure 32 on the outside face of the fixed cover 31.

When it is desired to no longer make use of the breaking saw in the cutting operation, the operator simply releases the off/on trigger switch 27 and it then returns to the 'off' attitude as shown in FIG. 2. This cuts off the air pressure to the pneumatic motor (not shown) in the primary handle's barrel portion 17 and, likewise, cuts off the high pressure air to the high pressure chamber 92 in the open/close motor 81 for the safety guard 11. Once high pressure air is cut off from the open/close motor's high pressure chamber 92, compression spring 82 forces the cylinder head 86 radially inward, the air in the high pressure chamber 92 being bled off to atmosphere back through line 91 and through the circular blade's pneumatic motor (not shown). As the cylinder head 86 is forced radially inward by the compression spring 82, yoke 68 (since yoke arms 67, 66 are pinned to the clamshells 42, 43,) causes the clamshells to pivot in opposite directions from the opened attitude of FIG. 3 to the closed attitude shown in FIG. 2. This for the reason that the pivotal connections 64, 65 of the yoke's arms 66, 67 with the clamshells' lugs 62, 63 are always on opposite sides of the imaginary line 94 that extends through the circular blade's rotational axis and is coaxial with the power cylinder's connecting rod 87. The two clamshells are positively located in the closed attitude, i.e., the closing motion of the clamshells is limited, by the noses 51, 52 interengaging one another at the closed attitude. The loading on compression spring 82 is such that the clamshells close substantially instantaneously once the high pressure air is cut off, thereby precluding any chance of harm to an operator as the circular blade 12 coasts to a stop within the safety guard 11 structure.

It will be noted there is no way to open the safety guard 11 structure of this invention (once it has reached the closed attitude shown in FIG. 2) without consciously spreading the clamshells 42, 43 open against the bias of compression spring 82, or without consciously starting rotation of the circular blade 12 by activating the off/on switch 27. That is, any external radial force on the clamshells 42, 43 along lines of force 95 (such as might occur when the saw 10 inadvertently touches an operator's arm or the like) will not open the clamshells from the closed to the opened attitude, or to any intermediate position. A further advantage of the safety guard 11 of this invention is that as soon as the off/on switch 27 trigger is released, i.e., as soon as it is desired to stop the circular blade 12 by releasing the switch trigger, the clamshells 42, 43 snap shut immediately because of the loading provided by compression spring 82 on the cylinder head within the open/close motor 81. This, in effect, acts as a dead man's safety switch on the safety guard 11 so that, in the event of power failure to the saw's drive motor for any reason, the safety guard 11 automatically closes. In addition, the entire safety guard 11 structure can be easily removed from the saw's housing 14 for cleaning the circular blade 12, or for blade 12 replacement, simply by unscrewing thumb screws 33, 34 and lifting the guard 11 (i.e., the clamshell 42, 43 assembly and fixed cover 31) from interengagement with the saw 10.

Having described in detail the preferred embodiment of my invention, what I desire to claim and protect by Letters Patent is:

1. A safety guard for a power saw, said power saw including a circular blade, comprising a fixed cover mounted to said saw to protect one segment of said circular blade, said fixed cover being maintained in fixed relation to said saw by attaching means, a movable cover pivotally mounted to said saw to protect the other segment of said circular blade, said movable cover being adapted to pivot between a closed position where same overlies the blade's periphery for protecting against inadvertent contact with that periphery, and an opened position where same exposes the circular blade's periphery for cutting, and said movable cover being pivotally mounted to said fixed cover, and an open/close motor interconnected with said movable cover and interconnected with said circular blade's off/on switch, said open/close motor automatically opening said movable cover to the opened position when said off/on switch is activated by an operator and automatically closing said movable cover to the closed position when said off/on switch is deactivated by an operator, said open/close motor being mounted on said fixed cover, thereby allowing the circular blade to be changed simply by releasing said attaching means and removing the safety guard relative to the saw's housing to expose said circular blade.

2. A safety guard for a saw as set forth in claim 1 wherein said movable cover is adapted to pivot between opened and closed positions about the rotational axis of said circular blade, said movable cover including two clamshells which retract away from one another to expose said circular blade as said movable cover pivots open and which extend toward one another to guard said circular blade as said movable cover pivots closed.

3. A safety guard for a saw as set forth in claim 2, said open/close motor including a yoke characterized by pivotal arms with each arm of said yoke being interconnected with one of said clamshells, said yoke being movable relative to the circular blade by said open/close motor to effect oscillation of said clamshells in opposite directions one from the other between opened and closed attitudes, and said open/close motor being one of a pneumatic motor, a hydraulic motor, and an electrical solenoid with said yoke being directly interconnected with said motor.

4. A safety guard for a power saw, said power saw including a circular blade, comprising a fixed cover mounted to the saw to protect one segment of said circular blade, a movable cover pivotally mounted to said fixed cover to protect the other segment of said circular blade, said movable cover including two separate clamshells adapted to pivot about the circular blade's rotational axis in opposite directions one from the other when being opened and closed between a closed position where same overlie the circular blade's periphery for protecting against inadvertent contact with that periphery and an opened position where same exposes the circular blade's periphery for cutting, and first stop means associated with said two clamshells for stopping pivotal movement of said clamshells in the closed position.

5. A safety guard for a saw as set forth in claim 4 including second stop means associated with said two clamshells for stopping pivotal movement of said clamshells in the opened position.

6. A safety guard for a saw as set forth in claim 4 including an open/close motor interconnected with said clamshells, said open/close motor being directly interconnected with the off/on switch for the circular blade's drive motor, said clamshells being pivoted to the opened position when the off/on switch is activated by an operator and said clamshells being pivoted to the closed position when the off/on switch is deactivated by an operator.

7. A safety guard for a saw as set forth in claim 6 including a yoke characterized by pivotal arms with each arm of said yoke being interconnected respectively with one of said clamshells and the crossbar of said yoke being interconnected with said open/close motor, said arms being located on opposite sides of the circular blade's rotational axis and on opposite sides of the imaginary line along which said yoke is reciprocated by said open/close motor.

8. A safety guard for a power saw as set forth in claim 4 wherein said fixed cover is adapted to enclose and protect between about 90° and about 180° of said circular blade's periphery, and wherein said clamshells are adapted to enclose and protect the remainder of said circular blade's periphery, said clamshells being located in different planes and being adapted to overlap one another beneath said fixed cover when said movable cover is opened.

* * * * *